United States Patent
Jiang et al.

(10) Patent No.: US 11,595,805 B2
(45) Date of Patent: Feb. 28, 2023

(54) METHOD FOR DISCOVERING DEVICE IN MESH NETWORK

(71) Applicant: Espressif Systems (Shanghai) Co., Ltd., Shanghai (CN)

(72) Inventors: Jiangjian Jiang, Shanghai (CN); Yuexia Qi, Shanghai (CN)

(73) Assignee: Espressif Systems (Shanghai) Co., Ltd., Shanghai (CN)

( * ) Notice: Subject to any disclaimer, the term of this patent is extended or adjusted under 35 U.S.C. 154(b) by 152 days.

(21) Appl. No.: 16/966,228

(22) PCT Filed: Jan. 8, 2019

(86) PCT No.: PCT/CN2019/070736
§ 371 (c)(1),
(2) Date: Jul. 30, 2020

(87) PCT Pub. No.: WO2019/149035
PCT Pub. Date: Aug. 8, 2019

(65) Prior Publication Data
US 2021/0051460 A1     Feb. 18, 2021

(30) Foreign Application Priority Data
Jan. 30, 2018   (CN) .......................... 201810088002.9

(51) Int. Cl.
*H04W 8/00* (2009.01)
*H04W 48/10* (2009.01)
*H04W 84/18* (2009.01)

(52) U.S. Cl.
CPC .......... *H04W 8/005* (2013.01); *H04W 48/10* (2013.01); *H04W 84/18* (2013.01)

(58) Field of Classification Search
CPC .............................. H04W 8/005; H04W 48/10
USPC ......................................................... 370/338
See application file for complete search history.

(56) References Cited

U.S. PATENT DOCUMENTS

2006/0142034 A1* 6/2006 Wentink ................ H04W 48/14
455/515
2007/0248038 A1* 10/2007 Yamasaki .............. H04B 7/022
370/328
2009/0238109 A1   9/2009 Byard et al.
(Continued)

FOREIGN PATENT DOCUMENTS

CN        103986631 A      8/2014
CN        104541314 A      4/2015
(Continued)

*Primary Examiner* — Faisal Choudhury
(74) *Attorney, Agent, or Firm* — Reinhart Boerner Van Deuren P.C.

(57) ABSTRACT

A method for discovering devices in a mesh network. After receiving a plurality of request frames sent by a large number of first devices, a second device sends a response frame via broadcast form times, at an interval of n; and each first device that receives the response frame establishes a mutual discovery relationship with the second device. In the event that an extremely large number of devices are present in the mesh network, the present invention may greatly improve the probability of discovery between devices, and effectively suppress network storming, thereby enabling the mesh network to maintain a good network performance.

5 Claims, 3 Drawing Sheets

(56) References Cited

U.S. PATENT DOCUMENTS

| | | | | |
|---|---|---|---|---|
| 2009/0310516 A1* | 12/2009 | Goel | ................. | H04W 74/0808 |
| | | | | 370/254 |
| 2015/0245283 A1* | 8/2015 | Park | ..................... | H04W 48/14 |
| | | | | 455/434 |
| 2015/0304942 A1* | 10/2015 | Wentink | ................ | H04W 48/16 |
| | | | | 370/312 |
| 2016/0007275 A1* | 1/2016 | Park | ..................... | H04W 48/16 |
| | | | | 455/434 |
| 2017/0185474 A1* | 6/2017 | Thoukydides | ........ | H04L 67/568 |
| 2018/0343554 A1* | 11/2018 | Ouzieli | ................ | H04W 8/005 |

FOREIGN PATENT DOCUMENTS

| | | |
|---|---|---|
| CN | 105100137 A | 11/2015 |
| CN | 106162796 A | 11/2016 |
| CN | 108337671 A | 7/2018 |

\* cited by examiner

METHOD FOR DISCOVERING DEVICE IN MESH NETWORK

TECHNICAL FIELD

The invention relates to a method for discovering devices in a mesh network.

BACKGROUND ART

A wireless mesh network, also known as "multi-hop" network, is a new wireless network technology completely different from a traditional wireless network.

In a traditional wireless local area network (WLAN), each client accesses network through a wireless link connected to an access point (AP). If users want to communicate with each other, they must firstly access a fixed access point. This type of network structure is called a single-hop network. In a wireless mesh network, any wireless device node may act as both an AP and a router. Each node in the network may send and receive signals, and each node may communicate directly with one or more peer nodes. The biggest advantage of such a structure is that if a nearest AP is congested due to excessive traffic, data may be automatically re-routed to a neighboring node with less communication traffic for transmission. Similarly, a data packet may continue to be routed to a next nearest node according to network conditions for transmission until reaching its final destination. Access in such a manner is multi-hop access.

Compared with a traditional switching network, the wireless mesh network eliminates wiring requirements between nodes, but still keeps redundancy mechanism and re-routing function provided by a distributed network. In a wireless mesh network, if a new device is to be added, one may only need to simply connect it to a power supply. It may automatically configure itself and determine an optimal multi-hop transmission path. When adding or moving a device, the network may automatically discover topology changes and automatically adjust communication routes to obtain the most effective transmission path.

In a scenario where there are n (dozens to hundreds of) mesh devices that are simultaneously controlled to be powered on to complete networking, each mesh device may rely on its own SoftAP interface to connect downwardly with a certain number of child nodes to extend the network size, and rely on its own Station interface to connect upwardly with its parent node. In order to rapidly form a network with a tree topology as shown in FIG. 1, a root node having good communication quality with the router shall be elected, and then a parent node having good communication quality with the current node shall be elected. In the above described election process, probe request frames have to be sent for several rounds or even dozens of rounds and relied on to discover as many nearby devices as possible to ensure that there is sufficient information to determine "good communication quality with the router" and "good communication quality with the current node". During the election process, each mesh device broadcasts its own probe request frames into the air via its Station interface; at this point, the device's SoftAP interface receives probe requests from nearly n−1 devices; if the probe requests are to be replied one by one via unicast, it has to take a long time to complete sending probe responses to nearly n−1 devices. When there are an extremely large number of devices present in the mesh network, the network bandwidth may be fully occupied by the probe responses from the senders, which may cause network storming, resulting in network performance degradation and even network paralysis. Moreover, those devices which have received the probe responses may also inevitably suffer huge latency, the entire conventional process cannot meet the needs of rapid device discovery.

SUMMARY OF THE INVENTION

The invention provides a method for discovering devices in a mesh network, which may, when there are a large number of devices in the mesh network sending request frames simultaneously, find fast routes, greatly improve the probability of discovery between devices and effectively suppress network storming, thereby maintaining a good network performance of the mesh network.

In order to achieve the above object, the present invention provides a method for discovering devices in a mesh network, which is deployed to implement the mutual discovery between any two devices in a mesh network, which may greatly improve the probability of discovery between devices and create good routing between the devices, the method comprising:

after receiving a plurality of request frames sent by a plurality of first devices, a second device sending a response frame via broadcast for a plurality of times, and each first device that receives the response frame and the second device discovering each other.

In the mesh network, a number of first devices that simultaneously send the request frames is greater than or equal to 20.

When the second device sends the response frame via broadcast, the second device sends the response frame for a total of m times, at an interval of n between each sending.

When the second device has received the plurality of request, frames sent by the plurality of the first devices and a previous batch of response frames have been sent, the second device generates a new response frame and sends the new response frame via broadcast for a plurality of times to the plurality of first devices.

When the second device has received the plurality of request frames sent by the plurality of first devices and the previous batch of frames have not been sent, then the second device continues to send the previous batch of response frames until the previous batch of response frames is sent, then the second device generates a new response frame and sends the new response frame via broadcast for a plurality of times to the plurality of first devices.

In the event that an extremely large number of devices are present in the mesh network, the present invention may greatly improve the probability of discovery between devices, create good routing between the devices, and effectively suppress network storming, thereby enabling the mesh network to maintain a good network performance.

DETAILED DESCRIPTION OF THE PREFERRED EMBODIMENTS

Preferred embodiments of the present invention are specifically described with reference to FIGS. 2 to 3.

Figure 1:
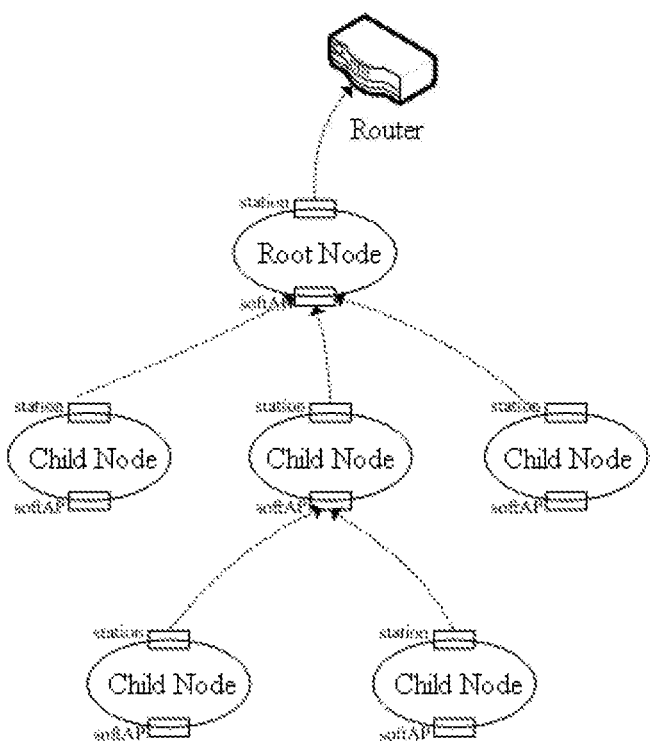
FIG. 1 is a schematic diagram of a tree topology according to prior art.
Figure 2:
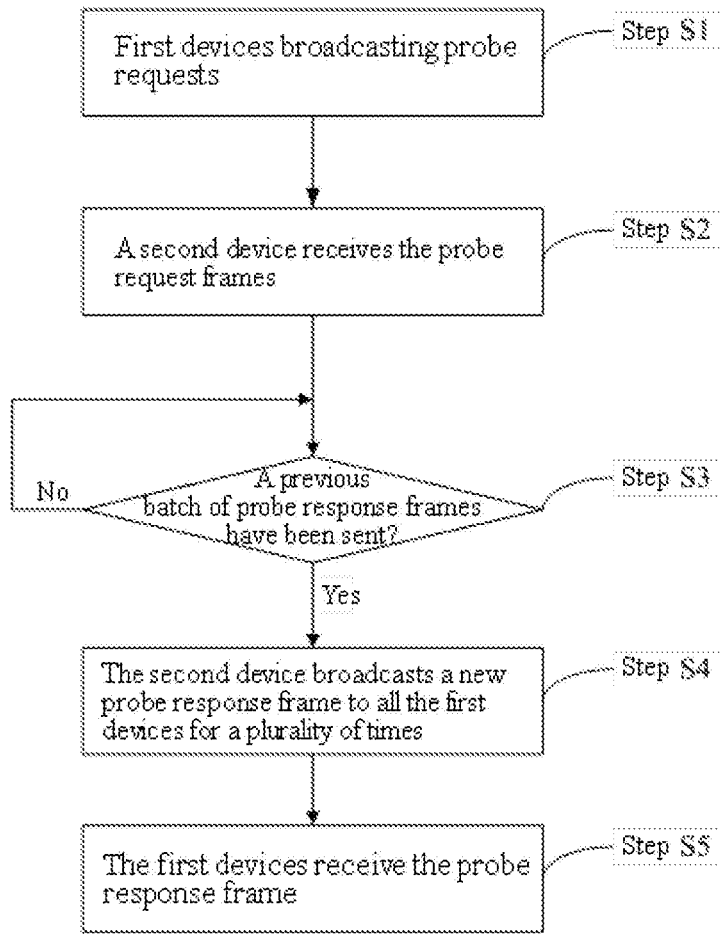
FIG. 2 is a flow chart of a method for discovering devices in a mesh network according to an embodiment of the invention.

As shown in FIG. 2, the present invention provides a method for discovering devices in a mesh network, which is applicable to situations where there are a large number of devices in the mesh network, and the method specifically includes the following steps:

step S1) first devices broadcasts (probe request) request frames;

step S2) a second device receives the probe request frames;

step S3) the second device determines whether a previous batch of (probe response) response frames have been sent. If so, it proceeds to step S4; otherwise, continues broadcasting the previous batch of probe response frames for a plurality of times;

step S4) the second device broadcasts a new probe response frame to all the first devices for a plurality of times; and step S5) the first devices receive the probe response frame, and at this time, the first devices and the second device have discovered each other.

The number of first devices that simultaneously send request frames is greater than or equal to 20.

Each time when the second device sends a batch of probe response frames, the second device sends the probe response frame via broadcast, for a total of m times, at an interval of n.

The second device may not send a probe response frame immediately after receiving the probe request frames, but firstly check whether the sending of the previous batch of probe response frames has been completed via broadcast for the plurality of times. If it has been completed, a new probe response frame is generated, and the new probe response frame is sent via broadcast for a plurality of times; or if the previous batch of the probe response frames have not been sent, the receiving of the current probe request frames by the second device will not be influenced.

At the same time, if there are a large number of devices in the mesh network, the second device may receive a large number of probe request frames. If the second device replies to each probe request frame by unicasting a probe response frame, the efficiency of replying is low. After switching to broadcast according to the invention, all the first devices may receive the response quickly; and because the reliability of broadcasting is significantly reduced as compared to unicasting, the probe response frame may be sent for several more times.

Figure 3:
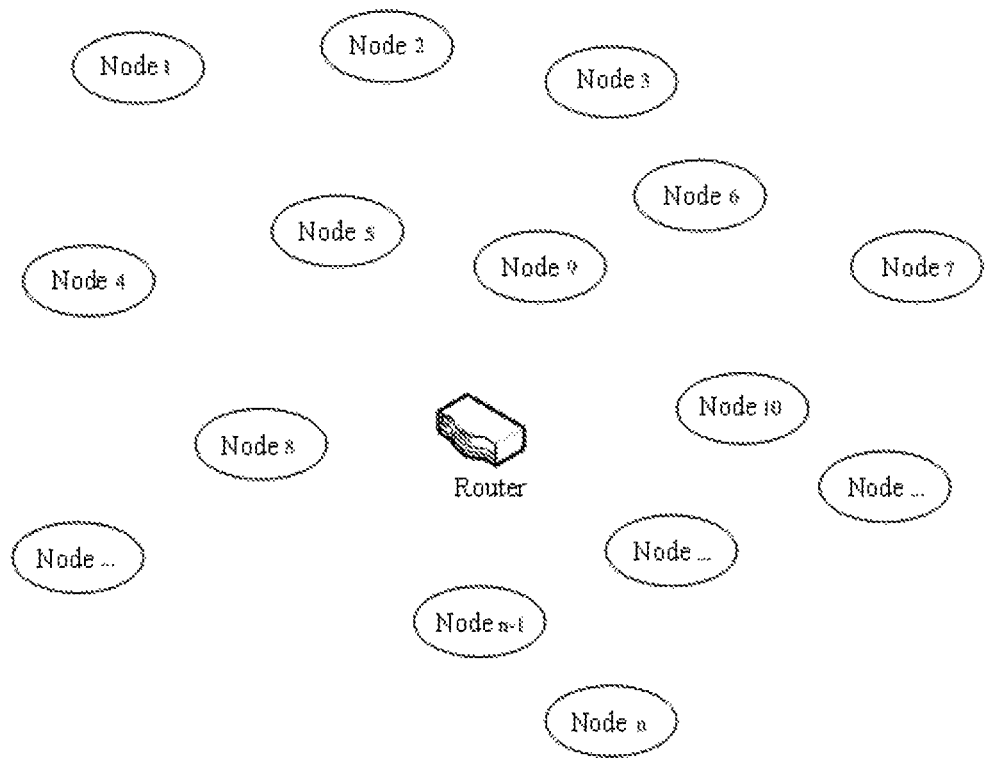
FIG. 3 is a schematic diagram of networking according to an embodiment of the present invention.

As shown in FIG. 3, in an embodiment of the present invention, n (dozens to hundreds of) mesh devices are controlled to be powered on at the same time to complete networking, and each mesh device broadcasts its own (probe request) request flame into the air via its Station interface, and the SoftAP interface of the mesh device receives the (probe request) request frames sent by nearly n−1 devices.

Taking node 1 as an example, after node 1 has received the (probe request) request frames sent by n−1 devices, if it is determine that the previous batch of probe response frames have been sent, then a new probe response frame is broadcasted to the n−1 devices, for a total of three times, at an interval of 50 ms, and each node that receives the probe response frame sent by node 1 and node 1 discover each other.

Taking node 2 as an example, after node 2 has received the (probe request) request frames sent by n−1 devices, if it is determined that the sending of the previous batch of probe response frames have not been completed, and then it continues to wait until all the previous batch of probe response frames have been sent, then node 2 broadcasts the new probe response frame to the n−1 devices, for a total of two times, at an interval of 40 ms, each node that, receives the probe response frame sent by node 2 and node 2 discover each other.

In the event that an extremely large number of devices are present in the mesh network, the present invention may greatly improve the probability of discovery between devices, create good routing between the devices, and effectively suppress network storming, thereby enabling the mesh network to maintain a good network performance.

Although the disclosure of the invention is described in detail with reference to the above described preferred embodiments, it shall be understood that the above described description shall not be considered as limitations to the invention. A person of ordinary skills in the art shall understand that various modifications and substitutions to the invention will become apparent after reading the above described disclosure. Thus, the scope of protection of the invention shall be defined according to the appended claims.

The invention claimed is:

1. A method for discovering devices in a mesh network, wherein the mesh network comprises a plurality of devices and a router for the plurality of devices, and wherein the method is operated to implement mutual discovery between any two devices in the mesh network, the method comprising:

simultaneously broadcasting, by the plurality of devices, a plurality of probe request frames, wherein each device of the plurality devices broadcasts its own probe request frames, and wherein the plurality of devices comprise a plurality of first devices and a second device, the second device is any device of the plurality of devices and the plurality of first devices are the other devices of the plurality of devices;

receiving, by the second device, probe request frames sent by the plurality of first devices;

sending, by the second device, a probe response frame via broadcast for a plurality of times responsive to the probe request frames sent by the plurality of first devices; and each first device that receives the probe response frame and the second device discovering each other.

2. The method for discovering devices in a mesh network according to claim 1, wherein in the mesh network, a number of the plurality of first devices simultaneously sending the probe request frames is greater than or equal to 20.

3. The method for discovering devices in a mesh network according to claim 1, wherein when the second device sends the probe response frame via broadcast, the second device sends the probe response frame for a total of m times, at an interval of n between each sending.

4. The method for discovering devices in a mesh network according to claim 3, wherein when the second device has received the probe request frames sent by the plurality of first devices and a previous batch of probe response frames have been sent, the second device generates a new probe response frame and sends the new probe response frame via broadcast for a plurality of times to the plurality of first devices.

5. The method for discovering devices in a mesh network according to claim 3, wherein when the second device has received the probe request frames sent by the plurality of first devices and the previous batch of probe response frames have not been sent, then the second device continues to send the previous batch of probe response frames until the previous batch of probe response frames are sent, then the second device generates a new probe response frame and sends the new probe response frame via broadcast for a plurality of times to the plurality of first devices.

\* \* \* \* \*